(12) United States Patent
Jun

(10) Patent No.: US 6,236,649 B1
(45) Date of Patent: May 22, 2001

(54) METHOD FOR CONTROLLING DIRECT CALL BETWEEN MOBILE SUBSCRIBER TERMINALS IN MOBILE COMMUNICATION SYSTEM

(75) Inventor: Je-Hyun Jun, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/105,028

(22) Filed: Jun. 25, 1998

(30) Foreign Application Priority Data

Jun. 25, 1997 (KR) .................................................. 97-27079

(51) Int. Cl.$^7$ ...................................................... H04J 1/00
(52) U.S. Cl. ............................................. 370/343; 455/458
(58) Field of Search .................................... 370/328, 329, 370/335, 342, 343, 344, 281, 282, 295; 455/403, 422, 435, 450, 455, 458, 42, 68

(56) References Cited

U.S. PATENT DOCUMENTS

| | | |
|---|---|---|
| 4,442,527 | 4/1984 | Munday . |
| 4,558,453 | 12/1985 | Mimken . |
| 4,887,265 | 12/1989 | Felix . |
| 4,998,290 | 3/1991 | Olenick et al. . |
| 5,124,698 | 6/1992 | Mustonen . |
| 5,142,654 | 8/1992 | Sonberg et al. . |
| 5,293,423 | 3/1994 | Dahlin et al. . |
| 5,343,497 | 8/1994 | Canosi et al. . |
| 5,361,401 | 11/1994 | Pirillo . |
| 5,390,216 | 2/1995 | Bilitza et al. . |
| 5,428,637 | 6/1995 | Oliva, Jr. et al. . |
| 5,440,614 | 8/1995 | Sonberg et al. . |
| 5,568,510 | 10/1996 | Tam . |
| 5,712,867 | 1/1998 | Yokev et al. . |
| 5,903,618 | * 5/1999 | Miyake et al. .................... 375/356 |

* cited by examiner

Primary Examiner—David R. Vincent
(74) Attorney, Agent, or Firm—Robert E. Bushnell, Esq.

(57) ABSTRACT

A method for controlling a direct call between mobile subscriber terminals in a mobile communication system includes the steps of: successively transmitting paging packets, from an originating mobile subscriber terminal, for searching for a terminating mobile subscriber terminal twice in response to a call execution command; and detecting synchronization by a firstly received paging packet to generate a hopping frequency, initialize a receiver and to wait for a paging packet of a hopping frequency, and transmitting a paging acknowledge packet to an originating mobile subscriber terminal in synchronization with a secondly received paging packet.

7 Claims, 4 Drawing Sheets

METHOD FOR CONTROLLING DIRECT CALL BETWEEN MOBILE SUBSCRIBER TERMINALS IN MOBILE COMMUNICATION SYSTEM

CLAIM FOR PRIORITY

This application makes reference to, incorporates the same herein, and claims all benefits accruing under 35 U.S.C. §119 from an application for METHOD FOR CONTROLLING DIRECT CALL BETWEEN MOBILE SUBSCRIBER TERMINALS IN MOBILE COMMUNICATION SYSTEM earlier filed in the Korean Industrial Property Office on Jun. 25, 1997, and there duly assigned Ser. No. 27079/1997, a copy of which application is annexed hereto.

BACKGROUND OF THE INVENTION

1. Technical Field

The present invention relates to a method for controlling a direct call between mobile subscriber terminals in a mobile communication system, and more particularly, to a control method which can prevent an out-of-sync during a direct call between mobile subscriber terminals.

2. Related Art

In general, a mobile communication system includes a radio access unit (RAU) which is known as a base station, and a plurality of mobile subscriber terminals (MSTs) which are known as mobile stations. For communication between the mobile subscriber terminals (MSTs) or between the mobile subscriber terminal (MST) and a wire terminal, a communication path is formed between the MSTs or between the MST and the wire terminal through the RAU using a frequency hopping technique. Exemplars of mobile communication systems are disclosed in U.S. Pat. No. 4,998,290 for Frequency-Hopping Radio Communication Network issued to Olenick et al., and U.S. Pat. No. 5,361,401 for Channel Hopping Radio Communication System And Method issued to Pirillo.

In such a frequency hopping scheme, all communication units must have the same timing, and each communication unit must be synchronized with the rapid frequency hopping code of the system in order to communication with the system. Conventional synchronization techniques for a mobile communication system are disclosed, for example, in U.S. Pat. No. 4,442,527 for Synchronization Systems issued to Munday, U.S. Pat. No. 4,558,453 for Synchronization Method And Frequency Hopping Communication System issued to Mimken, U.S. Pat. No. 5,293,423 for Synchronization Method In A Mobile Radio System issued to Dahlin et al., U.S. Pat. No. 5,343,497 for Method And Device For The Synchronization Between A Base Radio Station And A Mobile Radio Station In A Digital Radiomobile System issued to Canosi et al., U.S. Pat. No. 5,568,510 for Apparatus And Method For Obtaining Synchronism Between A Base Station And A Portable Unit Arranged For Operation In A Frequency Hopping System issued to Tam, U.S. Pat. No. 5,390,216 for Synchronization Method For A Mobile Radiotelephone issued to Bilitza et al., and U.S. Pat. No. 5,428,637 for Method For Reducing Synchronizing Overhead Of Frequency Hopping Communication Systems to Oliva, Jr. et al.

During communications between the mobile subscriber terminals (MSTs), if the MST deviates from the call service area of the radio access unit (RAU) or the call channels of the RAU are all in busy states, a call between adjacent mobile subscriber terminals (MSTs) may be impossible. In order to overcome this problem, a direct call has been implemented for communication between the mobile subscriber terminals (MSTs) without passing through the RAU for all areas irrespective of the call service area of the RAU. However, accurate synchronization between the originating MST and the terminating MST has been a problem. As a result, the implementation of direct call between adjacent mobile subscriber terminals (MSTs) has been difficult.

SUMMARY OF THE INVENTION

Accordingly, it is therefore an object of the present invention to provide a control method for a direct call between mobile subscriber terminals in a mobile communication system.

It is also an object to provide a hopping map control method for maintaining accurate synchronization between mobile subscriber terminals in a mobile communication system.

According to an aspect of the present invention, a control method for controlling a direct call between mobile subscriber terminals in a mobile communication system which implement a direct call by transmitting and receiving a control packet and a signal/traffic packet through a radio channel. The method comprises the steps of: successively transmitting two paging packets, from an originating mobile subscriber terminal, for searching for a terminating mobile subscriber terminal in response to a call execution command; and detecting synchronization by a firstly received paging packet to generate a hopping frequency, initialize a receiver and wait for a paging packet of a hopping frequency, and transmitting a paging acknowledge packet to the originating mobile subscriber terminal in synchronization with a secondly received paging packet.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
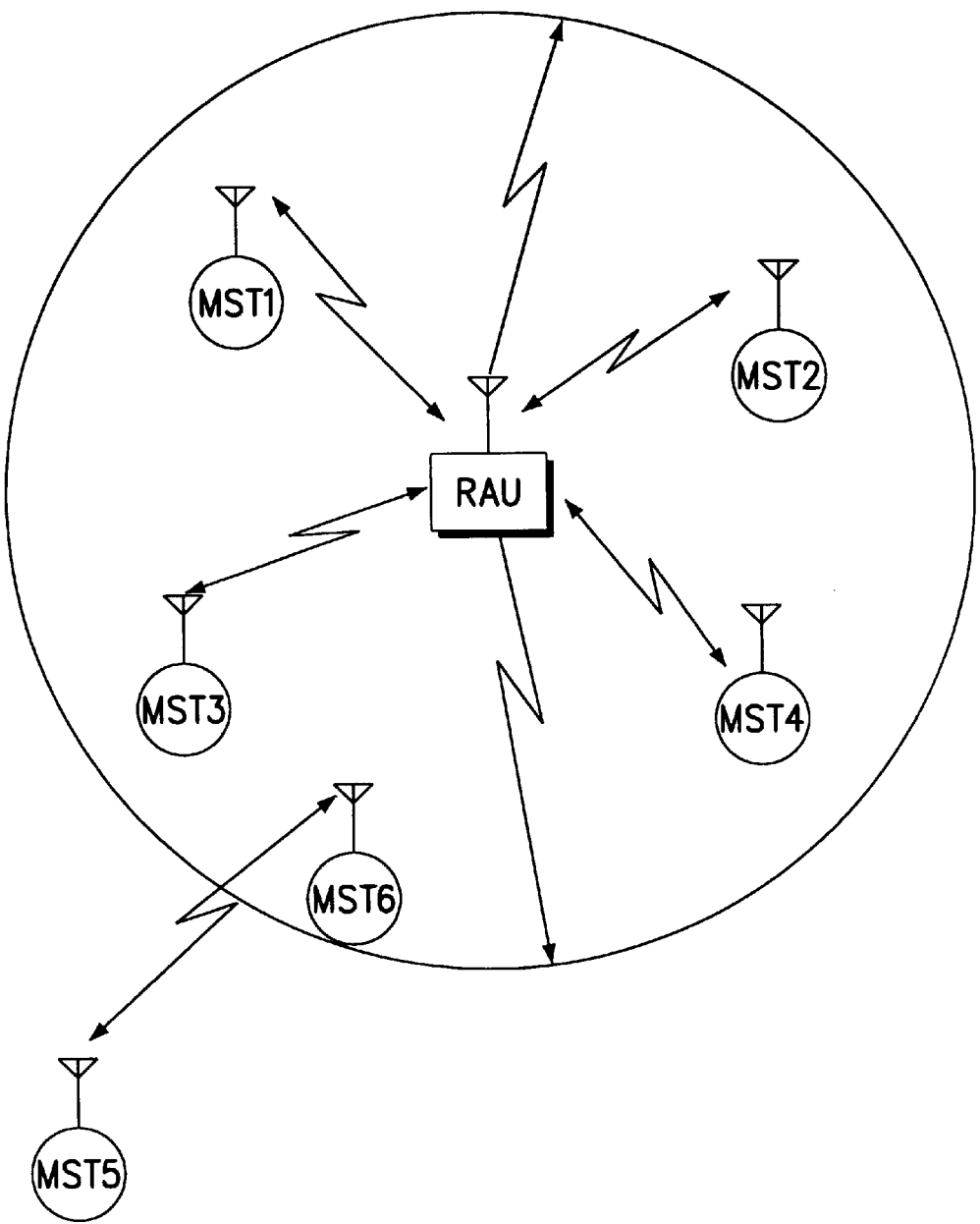
FIG. 1 illustrates a network of a mobile communication system.

Referring now to the drawings and particularly to FIG. 1, which illustrates a mobile communication system comprised of a radio access unit (RAU) and a plurality of mobile subscriber terminals (MSTs). The radio access unit (RAU), which is an exchange for mobile subscribers, implements flooding in response to a call request from the MSTi (where I is a natural number 1, 2, . . . N) to search for a destination subscriber and implements signaling between the MSTi and the destination subscriber to form a communication path therebetween. The RAU connects a mobile subscriber to a wire/wireless exchange system and has 8 channels. Each of the MSTs originates an outgoing call or receives an incoming call through the RAU within the coverage (i.e., a call service area) of the RAU.

For call service through the network of the mobile communication system as shown in FIG. 1, the MSTi must be registered in the RAU as a mobile subscriber. If there is an incoming call for searching for any MST is received from the exterior, the RAU connects the call to a corresponding MST only when the corresponding MST is registered. Therefore, the RAU must have a MST registration database for registering a plurality of mobile subscriber terminals (MSTs) within a call service area. Since the mobile subscriber terminals (MSTs) represent mobile subscribers, registration is managed through a radio channel with the RAU while moving.

If the MSTi registered in an RAUi is moved to a call service area of an RAUj (where j is a natural number 1, 2, . . . , N and I≠j), the MSTi senses this and implements registration operation. That is, if the MSTi registered in the RAUi enters a new call service area of the RAUj, it receives a control packet transmitted always from the RAUj. Then the MSTi analyzes information of the received control packet and determines whether to register itself in the RAUJ, in synchronization the received control packet. If it is determined that the MSTi is moved to the call service area of the RAUj from the call service area of the RAUi, the MSTi implements the registration operation. That is, the MSTi transmits registration packet data including its telephone number to the RAUj. The RAUj analyzes the contents of the registration packet data and broadcasts a search message for searching for the RAUi in which the MSTi has been registered to the network in order to prevent the MSTi from being repeatedly registered. This way the MSTi is registered in the RAUj and can implement outgoing or incoming call service through the RAUj. Since the RAUj and MSTi transmit and receive data not by frequency division multiple access (FDMA) but by frequency hopping of a code division multiple access (CDMA), communication between the RAUj and MSTi is secured and reliable.

In the frequency hopping system, hopping frequencies of the RAU and the MSTi must be known to each other. Moreover, the hopping frequency must be periodically updated for security purposes. For communication between the RAU and MST as shown in FIG. 1, control information (control packet), signaling information, and traffic information must be transmitted and received between the RAU and MST. The control packet is information indicating the status of an RAUj. The control packet is shown in the following Table 1. The signaling information is a pre-phase for a call between the RAU and MST and performs items implemented in a signaling process in which the call is in progress. The traffic information is transmitted to a speaker of a handset of the MST and causes the subscriber to head the call. Audio data of the subscriber is transmitted as a traffic packet to the RAU. The above information should be transmitted and received under frequency hopping environments.

TABLE 1

| 7EFH | MLEN |
|---|---|
| Link Number | MSG Type |

TABLE 1-continued

| MSG ID | SID |
|---|---|
| Call Service Area ID | RAU ID (h) |
| RAU ID (1) | TOD (1) |
| TOD (2) | TOD (3) |
| CH Status (1) | CH Status (2) |
| CH Status (3) | Cell Type |
| MST ID (1) | MST ID (2) |
| MST ID (3) | MST ID (4) |
| MST ID (5) | MST ID (6) |
| ST ID (7) | MST ID (8) |
| Power Strength | — |

The definition of each field in Table 1 is as follows. A link number is a logical link number to which a packet is transmitted and is expressed by a hexadecimal code:

0–7 : DSCH (dedicated signal channel) for transmitting a signaling packet and a traffic packet.

8: BCCH1 (board control channel #1 ) for transmitting a system information packet.

9: BCCH2 (board control channel #2) for transmitting a frequency information packet.

A: PCCH (acknowledge (ACK) or negative acknowledge (NACK))

B: ACH (request)

A message (MSG) type is a data field for processing a packet by a layer 2. A message (MSG) ID is for designating a destination of a packet. A SID is an identifier of a control packet. A call service area ID is a call service number to which the RAU belongs. If the call service area ID is "0", it is possible to operate independently. A RAU ID is an identifier of the RAU which currently transmits a control packet. A cell type indicates a cell type of the RAU. The cell type is indicated in Table 2.

TABLE 2

| Bit 7 | | Bit 6–Bit 3 | | | | | | | Bit 2–Bit 0 |
|---|---|---|---|---|---|---|---|---|---|
| 1/0 HOP | 1 | 2 | 3 | 4 | 5 | 6 | 7 | 8 | 9 Cell |
| Period | 2 | 4 | 8 | 16 | 32 | 64 | 128 | 256 | 512 Number |

The definition of each bit of the cell type is as follows:

Bit 7: Bit 7 of "1" indicates that the RAU uses a frequency area of a full band and bit 7 of "0" designates that the RAU is used as a frequency division mode.

Bits 6-3: Hop period (index)

Bits 2-0: Cell number assigned to the RAU

Meanwhile, TOD (1), TOD (2) and TOD (3) shown in Table 1 designate time information of date, hour, and minute, respectively. That is, TOD (1) designates a date byte; TOD (2) an hour byte; and TOD (3) a minute byte. Channel statuses (1), (2) and (3) are 24-bit information and designate the status of each of 8 radio channels. 3 bits are assigned to each channel:

Idle state: "000"

Paging state: "101"

In-use state: "111"

Access state: "010"

Power strength is a transmitting power of the RAU designated by 16 levels. MST IDs (1)–(8) are identifiers of the MSTs occupying the radio channels.

Figure 2:
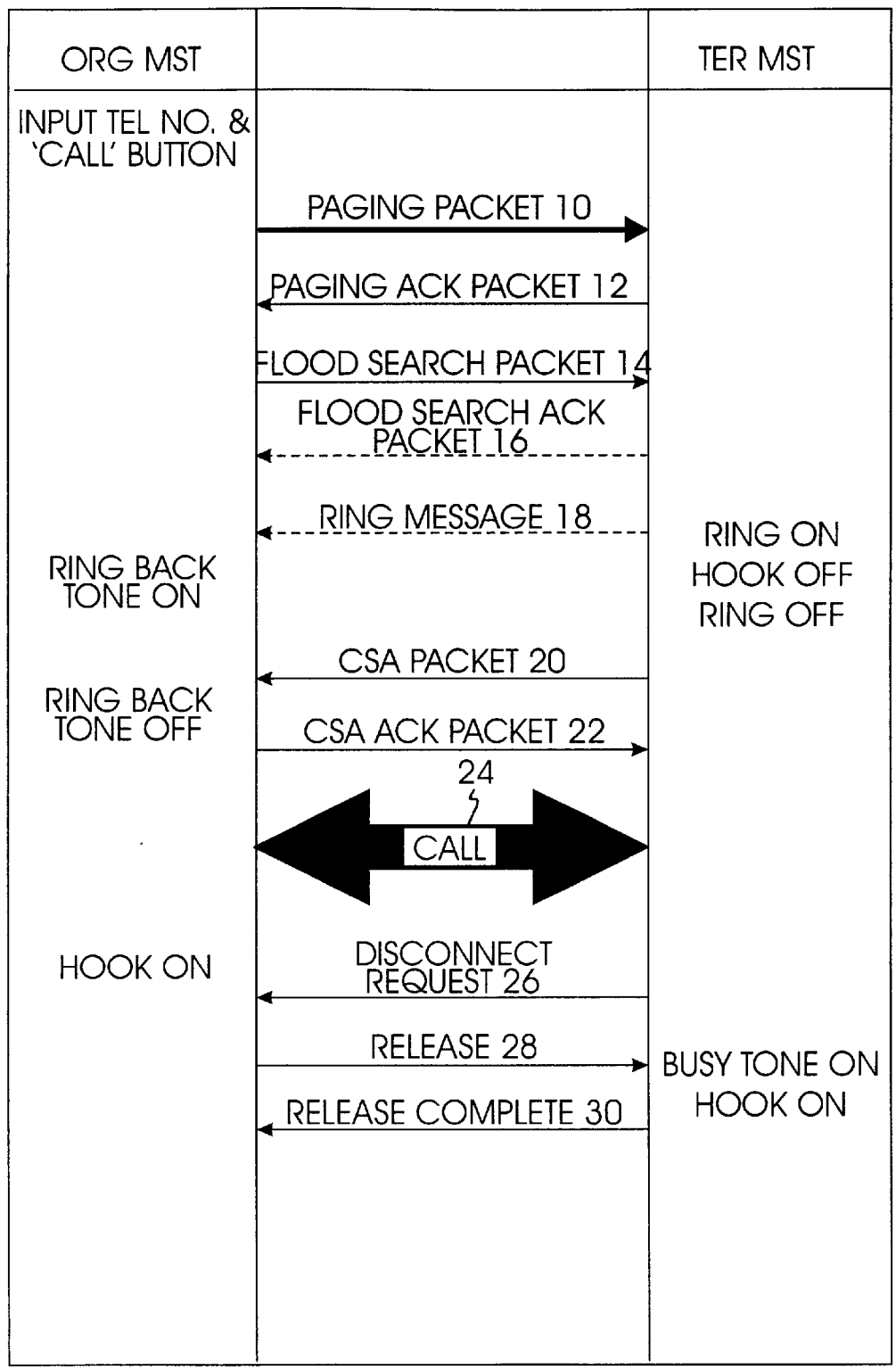
FIG. 2 is a flow chart of a typical control process of a direct call between mobile subscriber terminals.
Figure 3:
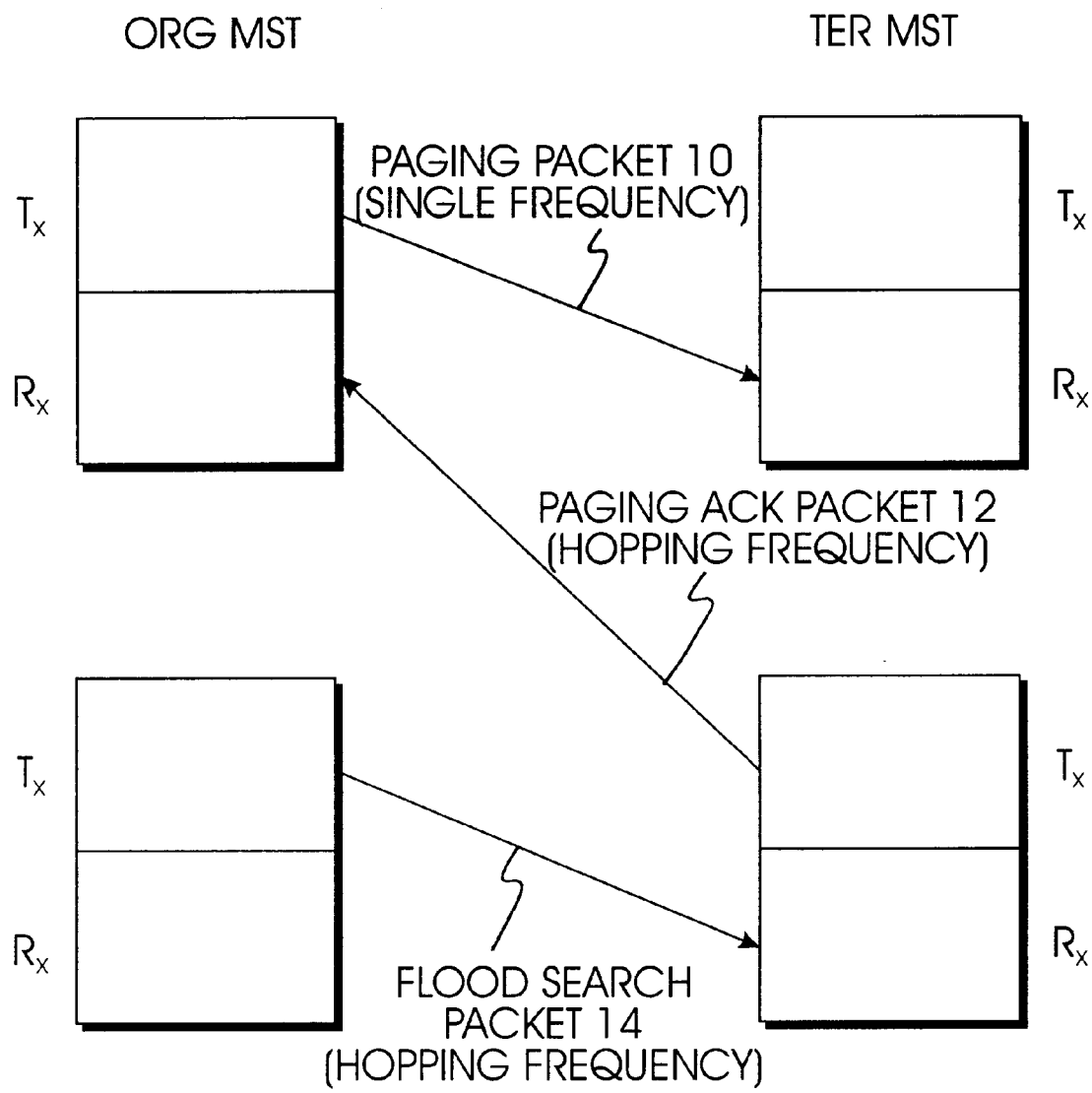
FIG. 3 illustrates a procedure for changing a hopping map during a direct call between mobile subscriber terminals.

In communicating between the MSTs, if the MST deviates from the call service area of the RAU or the call channels of the RAU are all in busy states, a call between adjacent mobile subscriber terminals (MSTs) may be impossible. In order to overcome this problem, a direct call has been implemented for communication between the mobile subscriber terminals (MSTs) without passing through the RAU for all areas irrespective of the call service area of the RAU. Such a direct call between MSTs must be made using a frequency hopping technique. For example, FIG. 1 illustrates a direct call between MST5 and MST6. A typical control process of a direct call between MSTs is illustrated in FIG. 2. Likewise, a procedure for changing a hopping map during a direct call between MSTs is illustrated in FIG. 3.

For example, if the subscriber of an originating MST ("ORG MST") sequentially presses a telephone number of a terminating MST ("TER MST") and a call button, the ORG MST transmits a paging packet at step 10. In this case, a part of the entire frequency band is assigned to the ORG MST as a direct call frequency band. A part of the direct call frequency band is assigned as a direct call control frequency band. The ORG MST selects one of the direct call control frequency band to transmit the paging packet. Under the state that the ORG MST transmits a single frequency without hopping a frequency, the TER MST searches for all the direct call control frequency band. This is because the TER MST does not know which frequency among the direct call control frequency band is received as the paging packet.

When the TER MST receives the paging packet by searching for the direct call control frequency band, a hopping frequency is generated on the basis of various parameter within the paging packet transmitted from the ORG MST. The TER MST transmits a paging acknowledge packet on the basis of the hopping frequency at step 12. The TER MST waits for a flood search packet with the hopping frequency. Theses steps are illustrated in detail in FIG. 3.

The TER MST transmits the paging acknowledge packet while hopping the frequency. The ORG MST scans the hopping frequency while transmitting the paging packet. Therefore, even though the TER MST transmits the paging acknowledge packet while hopping the frequency, the ORG MST accurately receives the paging acknowledge packet. The ORG MST transmits the flood search packet upon receipt of the paging acknowledge packet at step 14. The TER MST receiving the flood search packet transmits a flood search acknowledge packet at step 16. The TER MST transmits a ring message at step 18 and generates a ring signal. A ring back tone is then sent to the handset of the ORG MST.

If the subscriber off-hooks the handset of the TER MST, the TER MST turns off the ring signal and transmits a ring back tone off packet (CSA) at step 20. If the ORG MST transmits a CSA acknowledge packet at step 22, a communication path is formed at step 24. If a disconnect request signal is transmitted from the TER MST at step 26, the ORG MST transmits a release signal to the TER MST at step 28. The TER MST transmits a release complete signal to the ORG MST at step 30.

However, in the typical control process of a direct call between MSTs of a mobile communication system, the TER MST may lose synchronization while waiting for the flood search packet. This is because the ORG MST transmits the paging packet of a single frequency and the TER MST waits for the flood search packet with a hopping frequency. Then the TER MST must initialize its receiver, but such initialization cannot be made because it is transmitting the paging acknowledge packet. Therefore, in the contemporary control process of a direct call between the MSTs, the synchronization between the ORG MST and the TER MST can not be accurately maintained and thus the implementation of the direct call between the ORG MST and TER MST has been difficult.

Figure 4:
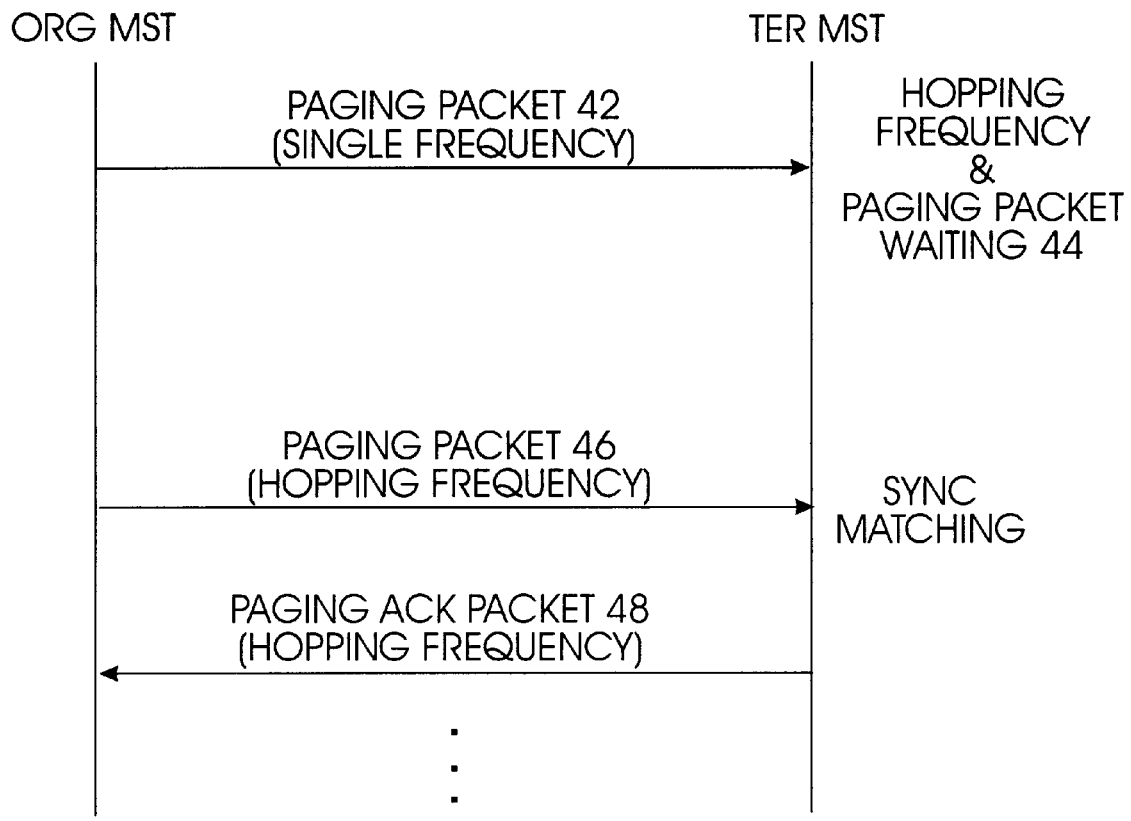
FIG. 4 is a flow chart of a control process of a direct call between mobile subscriber terminals according to the principles of the present invention.

Turning now to FIG. 4, which illustrates a control process of a direct call between mobile subscriber terminals according to the principles of the present invention. An ORG MST is required to transmit a paging packet for searching for a TER MST twice. If the subscriber of the ORG MST sequentially presses a telephone number of the TER MST and a call button, the ORG MST transmits a paging packet of a single frequency to the TER MST at step 42. In this case, a part of the entire frequency band is assigned as a direct call frequency band, and a part of the direct call frequency band is assigned as a direct call control frequency band. The ORG MST selects one of the direct call control frequency band to transmit the paging packet for about 2 seconds. The paging packet from the ORG MST is transmitted to all the adjacent TER MSTs.

The TER MST receives the paging packet of a single frequency and adjusts synchronization. At step 44, the TER MST generates a hopping frequency on the basis of various parameters within the paging packet of the received single frequency. The TER MST generating the hopping frequency initializes an internal receiver and waits for the reception of the paging packet of the hopping frequency. The ORG MST transmits the paging packet of the hopping frequency for about 4 seconds at step 46. The TER MST synchronizes the hopping frequency of the initialized receiver with the paging packet of the hopping frequency. The TER MST transmits a paging acknowledge packet to the ORG MST on the basis of the synchronized hopping frequency at step 48. The TER MST transmitting the paging acknowledge packet waits for a flooding search packet with the hopping frequency from the ORG MST.

After the synchronization between the ORG MST and the TER MST is maintained, the signal/traffic information for forming a communication path between the ORG MST and TER MST is transmitted and received to perform a call. After the call is completed, the signal/traffic information for completing the call is transmitted and received to release the communication path. Therefore, the synchronization between the ORG MST and TER MST is adjusted by the paging packet of the single frequency and maintained by the paging packet of the hopping frequency, thereby preventing the out-of-sync during a direct call. Consequently, during a direct call between MSTs in the mobile communication system, the ORG MST transmits the paging packet of the single frequency and the paging packet of the hopping frequency to the TER MST. The TER MST adjusts the synchronization by the paging packet of the single frequency and maintains the synchronization by the paging packet of the hopping frequency. Therefore, the synchronization cannot be lost.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A method for controlling a direct call between mobile subscriber terminals in a mobile communication system which implement a direct call by transmitting and receiving a control packet and a signal/traffic packet through a radio channel, said method comprising the steps of:

successively transmitting two paging packets representing said control packet and said signal/traffic packet, from an originating mobile subscriber terminal, for searching for a terminating mobile subscriber terminal in response to a call execution command; and detecting synchronization by a firstly received paging packet to generate a hopping frequency, initialize a receiver and wait for a paging packet of a hopping frequency, and transmitting a paging acknowledge packet to the originating mobile subscriber terminal in synchronization with a secondly received paging packet.

2. The method of claim 1, wherein said two paging packets transmission step comprises of successively transmitting a paging packet of a single frequency for 2 seconds and a paging packet of a hopping frequency for 4 seconds.

3. The method of claim 1, further comprised of said firstly received paging packet corresponding to a paging packet of a single frequency transmitted for 2 seconds and said secondly received paging packet corresponding to a paging packet of a hopping frequency transmitted for 4 seconds.

4. A method for controlling a direct call between mobile subscriber terminals in a mobile communication system which implement a call by transmitting and receiving a control packet and a signal/traffic packet through a radio channel, said method comprising the steps of:

transmitting a paging packet of a single frequency for searching for a terminating mobile subscriber terminal and re-transmitting a paging packet of a hopping frequency, in response to a call execution command;

generating a hopping frequency in synchronization with the paging packet of a single frequency, initializing a receiver and waiting for a paging packet of a hopping frequency; and transmitting a paging response packet to an originating mobile subscriber terminal in synchronization with the hopping frequency.

5. The method of claim 4, wherein said paging packet of a single frequency is transmitted for 2 seconds and said paging packet of a hopping frequency is transmitted for 4 seconds.

6. A method for controlling a direct call between mobile subscriber terminals in a mobile communication system, comprising the steps of:

transmitting a paging packet of a single frequency, at an originating mobile subscriber terminal, for searching for a terminating mobile subscriber terminal, in response to a call execution command;

generating a hopping frequency, at the terminating mobile subscriber terminal, in synchronization with the paging packet of a single frequency, initializing a receiver and waiting for reception of a paging packet of a hopping frequency;

transmitting said paging packet of a hopping frequency, at the originating mobile subscriber terminal;

synchronizing the hopping frequency of the initialized receiver with said paging packet of a hopping frequency, at the terminating mobile subscriber terminal, upon receipt of said paging packet of a hopping frequency; and transmitting a paging response packet, at the terminating mobile subscriber terminal to the originating mobile subscriber terminal, in synchronization with the hopping frequency.

7. The method of claim 6, wherein said paging packet of a single frequency is transmitted for 2 seconds and said paging packet of a hopping frequency is transmitted for 4 seconds.

* * * * *